(12) United States Patent
Carr et al.

(10) Patent No.: US 10,346,894 B2
(45) Date of Patent: Jul. 9, 2019

(54) METHODS AND SYSTEMS TO CREATE PURCHASE LISTS FROM CUSTOMER RECEIPTS

(71) Applicant: Wal-Mart Stores, Inc., Bentonville, AR (US)

(72) Inventors: David Jon Carr, Mountain View, CA (US); Richard Mark Ramsden, Foster City, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 40 days.

(21) Appl. No.: 14/109,654

(22) Filed: Dec. 17, 2013

(65) Prior Publication Data

US 2015/0170251 A1    Jun. 18, 2015

(51) Int. Cl.
*G06Q 30/06* (2012.01)

(52) U.S. Cl.
CPC ................ *G06Q 30/0631* (2013.01)

(58) Field of Classification Search
None
See application file for complete search history.

(56) References Cited

U.S. PATENT DOCUMENTS

| | | | |
|---|---|---|---|
| 6,113,148 A | 9/2000 | Koranda | |
| 6,249,774 B1 | 6/2001 | Roden | |
| 6,386,450 B1 | 5/2002 | Ogasawara | |
| 6,963,851 B1 * | 11/2005 | Szabo et al. | 705/26.8 |
| 7,130,814 B1 | 10/2006 | Szabo | |
| 7,130,820 B2 | 10/2006 | Song | |
| 7,614,547 B2 | 11/2009 | Kotas | |
| 8,126,784 B1 | 2/2012 | Agarwal | |
| 8,458,001 B2 | 6/2013 | Gerlach | |
| 8,538,807 B2 | 9/2013 | Dishneau | |
| 8,583,512 B1 | 11/2013 | Gupta | |
| 2003/0018537 A1 | 1/2003 | Tomita | |

(Continued)

FOREIGN PATENT DOCUMENTS

| | | |
|---|---|---|
| EP | 0856812 A2 | 8/1998 |
| EP | 1303822 A2 | 4/2003 |

OTHER PUBLICATIONS

Indvik "Receipt-Scanning App Tracks Price Drops So You Don't Have to" Mashable, Aug. 10, 2012 https://mashable.com/2012/08/10/eyeona/ (Year: 2012).*

*Primary Examiner* — Kathleen Palavecino
*Assistant Examiner* — Lance Y Cai
(74) *Attorney, Agent, or Firm* — Bryan Cave Leighton Paisner LLP

(57) ABSTRACT

A method for providing purchase suggestions to a customer is provided. The method may include a computer server associated with a store receiving multiple receipts for past purchase transactions from a customer. The server may identify products on the receipts and analyze the products and receipt dates to determine a frequency with which the customer purchases a particular product. The server may also determine a date when the customer last purchased the particular product and transmit a purchase suggestion for the product to the customer at a time correlated with the customer needing to purchase the particular product based on a date when the customer last purchased the particular product and the frequency with which the customer purchases the particular product.

6 Claims, 8 Drawing Sheets

(56) References Cited

U.S. PATENT DOCUMENTS

| | | |
|---|---|---|
| 2003/0172005 A1 | 9/2003 | Hellal |
| 2008/0293392 A1 | 11/2008 | Strother |
| 2010/0030624 A1* | 2/2010 | Vanska et al. ............... 705/10 |
| 2010/0280880 A1 | 11/2010 | Faith |
| 2011/0246215 A1 | 10/2011 | Postma |
| 2012/0259700 A1 | 10/2012 | Hellal |
| 2012/0284081 A1* | 11/2012 | Cheng et al. ............... 705/7.29 |
| 2013/0073392 A1 | 3/2013 | Allen |
| 2013/0085957 A1 | 4/2013 | Stimson |
| 2013/0097002 A1* | 4/2013 | Dishneau ............... G06Q 30/02 705/14.25 |
| 2013/0210461 A1* | 8/2013 | Moldavsky ........ G06Q 30/0261 455/456.3 |
| 2015/0032538 A1* | 1/2015 | Calman .............. G06Q 30/0255 705/14.53 |

* cited by examiner

METHODS AND SYSTEMS TO CREATE PURCHASE LISTS FROM CUSTOMER RECEIPTS

BACKGROUND

Field of the Disclosure

The present invention relates to shopping. In particular, examples of the present invention relate to a system for analyzing receipts provided by a customer to determine purchase patterns and provide favorites lists and purchase suggestions to the customer.

Background

There are many benefits to online shopping; both for customers and for stores. Properly executed, online shopping can increase sales and efficiency for a store. Many customers may not adopt online shopping technology because they are unfamiliar with the advantages of online shopping, are unfamiliar with the technology associated with or used in connection with online shopping, or simply do not have sufficient time or motivation to begin shopping online.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
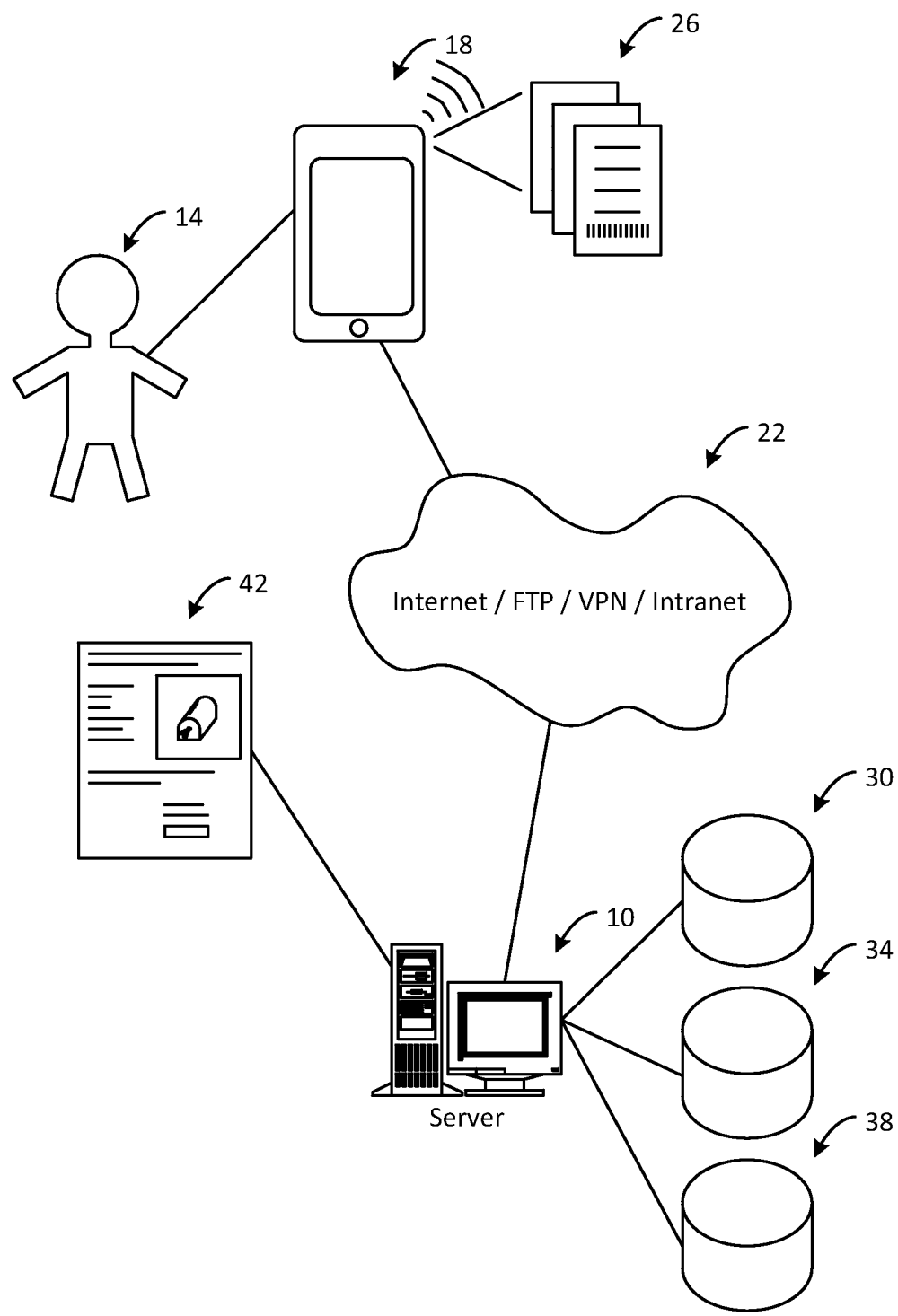
FIG. 1 is a schematic illustrating a computer system in context of a receipts module.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present invention may be written in any combination of one or more programming languages.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The flowchart and block diagrams in the flow diagrams illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The disclosure particularly describes how to provide favorites lists or suggested purchases to customers who have an account with a store. Particularly, the present disclosure describes how a computer system may be used to provide suggested purchases to a customer based on receipt data obtained from the customer.

Many retailers are offering additional online purchasing services. Many customers have begun to adopt these services. There are, however, many customers who are unfamiliar with computer technology or lack the time or motivation to create an account with a store and utilize online services provided by the store. These customers do not receive the benefit of the additional services provided by the store.

A computer system is utilized to assist customers in utilizing customer accounts at a store and receive benefits from maintaining a customer account, online shopping, etc. A customer may create an account with a store to utilize additional shopping features. A store computer system may receive shopping receipts from a customer. These shopping receipts may be in many different formats. The computer system may process the receipts and analyze the purchases made by the customer. The computer system may determine what types of products the customer has purchased and determine the frequency with which the customer purchases those products. The computer system may then record customer purchase information and may associate the customer purchase information with the customer account. As the customer utilizes the customer account to shop at the store, the computer system may suggest items for purchase at times when the customer is likely to need those items based off of information received from previous customer receipts.

Referring to FIG. 1, a system may include a server 10 or other computer associated with a store. The server 10 may facilitate the collection and presentation of information to a customer 14 in the process of interacting with the customer during shopping experiences. The server 10 may communicate with the customer 14 via another computer 18 and via the internet 22 or other communication systems.

The computer system may also include other computing devices. Particularly, the system may include a computer 18 associated with the customer 14. The computer 18 may be one of a variety of different electronic devices such as a smart phone, tablet computer, laptop, personal computer, etc. The customer 14 may use a computer 18 to provide information to the server 10 and to receive information from the server 10 in the context of shopping at a store.

The computer 18 may be used to send receipt information associated with various shopping receipts 26 to the server 10. The server 10 may receive information regarding the various receipts 26 and may process or analyze the information. The server 10 may query a product database 30 in analyzing the receipts 26. The product database 30 may include product information. The product database 30 may include product UPC codes, prices, descriptions, etc. The server 10 may also query a transaction database 34. The transaction database 34 may include transaction information for purchases made at the store. The server 10 may analyze the receipts 26 against the product database 30 and transaction database 34 to retrieve purchase information associated with the customer 14.

The server 10 may store customer data. The server 10 may store information regarding the customer 14 and regarding customer preferences in the context of a customer account created by the customer. The server 10 may thus store contact information for the customer 14 (or for the electronic device 18 used by the customer and associated with the customer account). The server 10 may also store customer purchase history and purchase information associated with the customer 14. Such information may be stored in a customer database 38.

The server 10 may use the customer information from the customer database 38 to provide purchase suggestions 42 to the customer 14. The purchase suggestions 42 may be provided in the context of the customer shopping at the store while utilizing the electronic device 18. The purchase suggestion 42 may be a suggestion of an item which is routinely purchased by the customer.

The server 10 may be connected to the internet 22 via a modem, router, or the like. Similarly, the electronic device/computer 18 may be connected to the internet via a wired or wireless router when such a connection is available. The electronic device 18 may also be connected to the internet via a cellular network to provide communications when the device 18 is not in communication range of a wireless router or the like.

The software, hardware, and associated components of a computer system may be programmed and configured to implement one or more embodiments described herein. Customers 14 may communicate with a store server 10 via a computer 18 and a network connection or internet connection 22 to transmit receipt information to the server 10 and to receive purchase information from the server 10. Particularly, the computer 18 may retrieve purchase suggestions 42 which are specific to the customer purchase history.

To participate in online or computer assisted shopping with the store, customers 14 may be invited to create an account with the server 10. Customers 14 who desire a store account will create an account with the server 10 and provide customer information such as identifying information, password information, contact information, etc. The server 10 may store customer information in a record associated with the customer 14 in a customer database 38.

After creation of a customer account, the server 10 may invite the customer 14 to transmit receipt information to the server 10, typically via the electronic device 18. The server 10 may present the benefits or advantages associated with providing receipt data to the customer 14 to encourage the customer to provide receipt data to the server 10.

Figure 2:
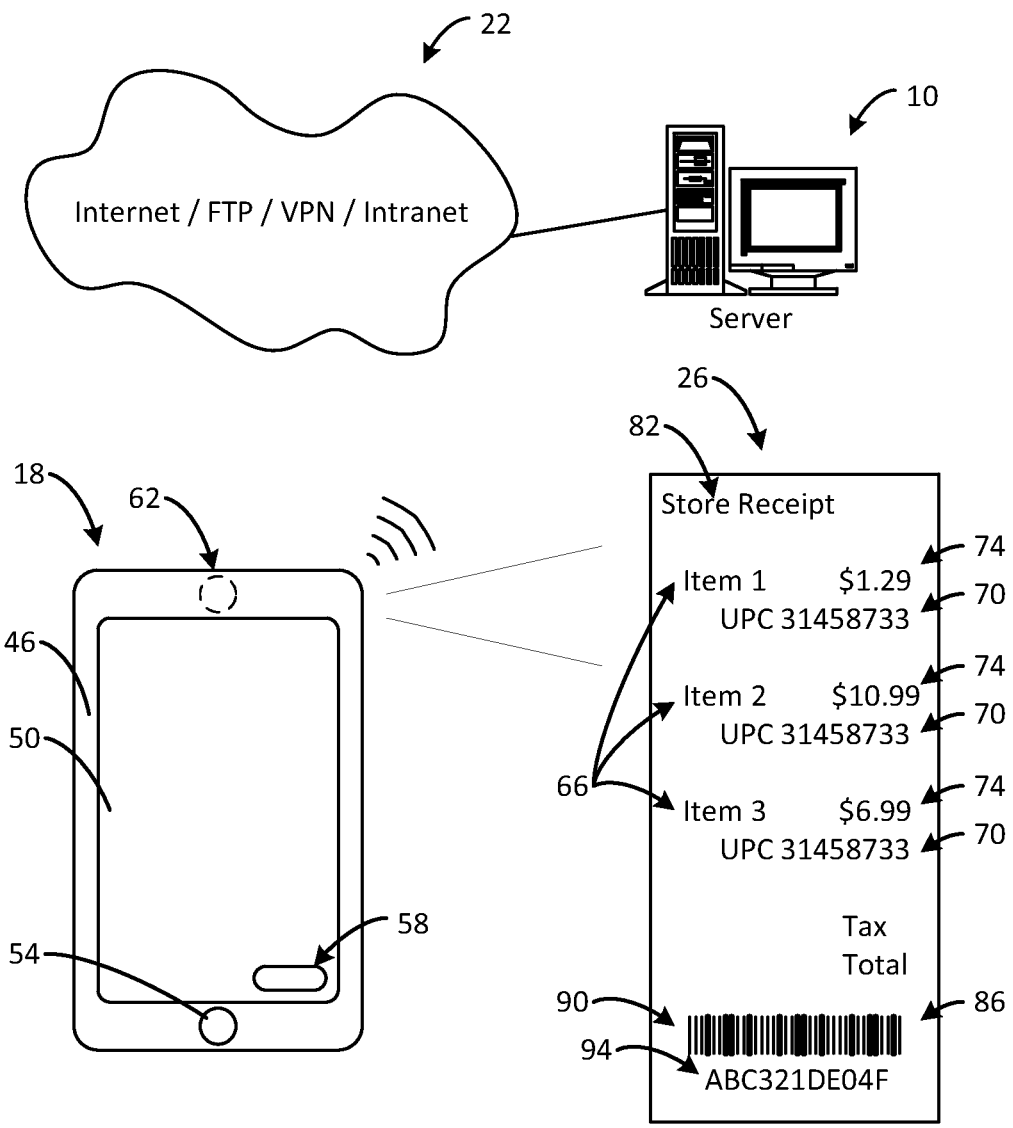
FIGS. 2, 3, and 4 are schematics illustrating various aspects of the computer system.

Referring to FIG. 2, the computer 18 (smart phone, tablet computer, laptop, desktop computer, etc.) typically includes a body or case 46 which houses internal electronics such as a processor, memory, battery, wireless communications device, etc. The computer 18 includes a user interface such as screen 50. Typically, the screen 50 is a display screen which presents information to a user and, in many instances, may also be a touch screen which accepts inputs from a user to allow the user to control the computer 18. The computer 18 may include various hardware buttons 54 which allow a user to operate the device, navigate through menus, etc. The computer 18 may include various software buttons 58 which allow a user to select software, change software or hardware settings, etc. The computer 18 may also include a camera 62.

The various components of the computer 18 allow the computer 18 to perform the functions and display the data discussed herein.

The customer 14 may use the computer 18 to transmit receipt information to the server 10. The customer may be in possession of various receipts 26. Each receipt 26 may include different pieces of information. An example receipt 26 may include information about one or more items 66 which were purchased as part of the transaction which generated the receipt 26. The receipt 26 may also show a UPC code 70 associated with the item 66. A UPC code 70, also known as a universal product code, is a code (numeric or machine readable) which identifies a product. The UPC code 70 is typically a universal code which will identify one item even among different stores. The receipt 26 may also display the price 74 of the item(s) 66. The receipt 26 will typically display the date 78 upon which the purchase transaction was completed.

The receipt 26 may also identify the store 82 where the purchase was made. For many stores, a receipt 26 may have a transaction identification code 86 (transaction ID) associated with the particular purchase transaction. The identification code 86 may be presented as a machine readable code 90, an alphanumeric code 94, or both.

The customer 14 may use the computer 18 to transmit information regarding the receipt 26 to the server 10. For receipts which are associated with the store to which the customer account and server 10 pertain, the customer may enter the transaction identification code 86. The customer 14 may, for example, type the code 94 into a keyboard or other data entry device. More particularly, the server 10 may be programmed to receive an image of any receipt regardless of where (i.e. what particular store) the receipt originates. The customer may use a camera 62 on the computer 18 to capture an image of the receipt 26 and a receipts module on the computer 18 may transmit the image of the receipt 26 to the server 10.

Figure 3:
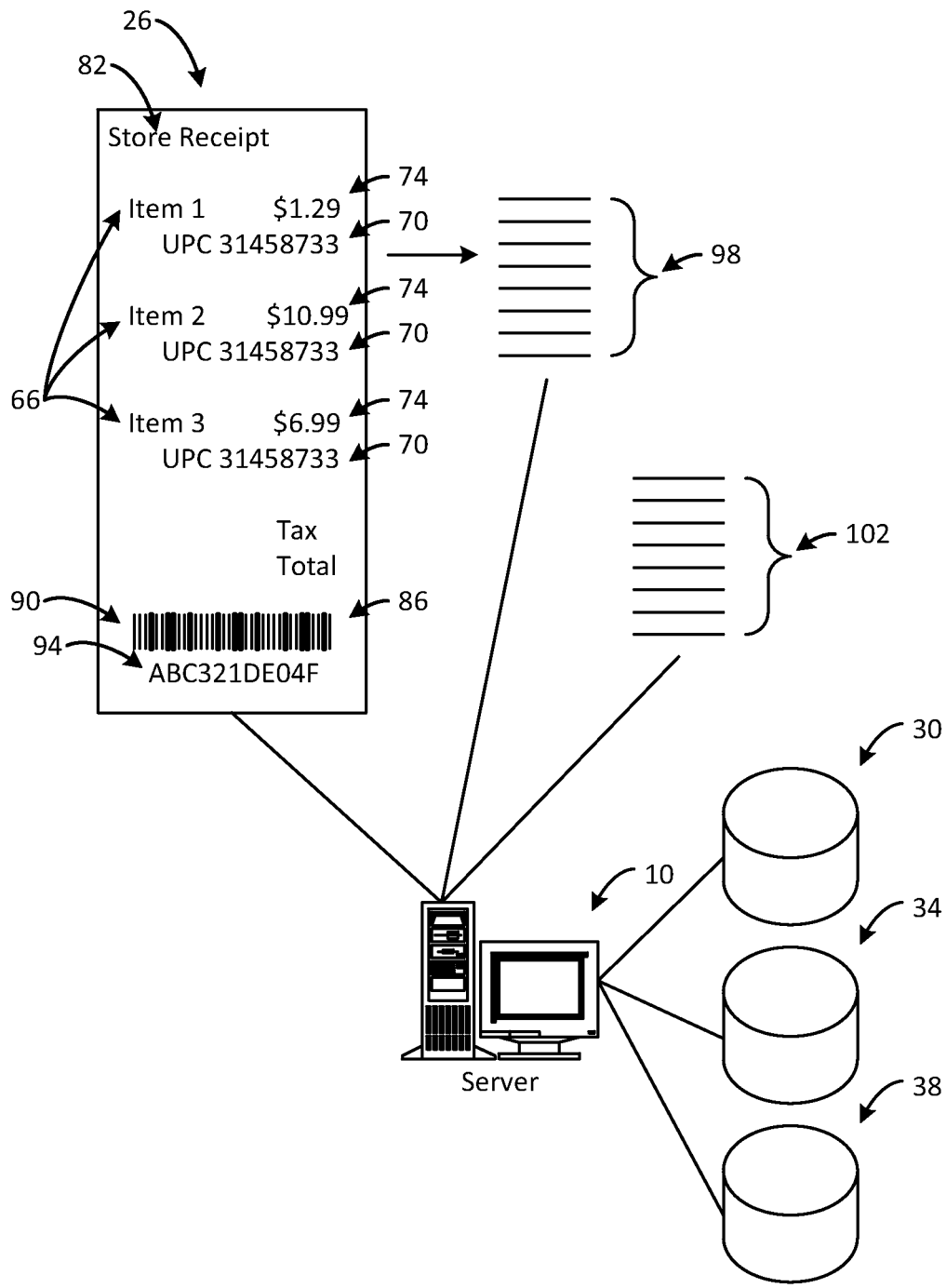

Referring now to FIG. 3, the server 10 may process the receipts 26 provided by the customer 14. While a single computer 18 or server 10 are shown, the functionality of that device may be accomplished with multiple computer devices working together. For example, it may be desirable to have multiple servers 10 handling the functionality discussed with respect to server 10. Additionally, the server 10 may interface with multiple customers and multiple electronic devices 18 in the manner discussed herein.

The server 10 may be programmed to identify data fields in the receipt 26 and extract relevant data from the receipt. The server 10 may process a receipt 26 with an ordered approach to retrieve receipt data. The server 10 may identify a transaction ID 86 on the receipt. The server 10 may read the machine readable code 90 from the receipt image, or may recover the alphanumeric code 94 from the receipt image via optical character recognition (OCR). The server 10 may then query the transaction database 34 to determine if the receipt pertains to a transaction from the store to which the server 10 pertains. If so, the server may retrieve transaction information from the transaction database 34, including the items 66, UPC codes 70, prices 74, date 78, etc. associated with the receipt.

If there is no corresponding transaction ID 86, the server 10 may process the receipt 26 via the receipt image. The server 10 may perform OCR on the receipt image and may identify the items 66, UPC codes 70, prices 74, date 78, etc. associated with the receipt from the receipt image. As UPC codes are associated with the item and not with the store, the server 10 may retrieve product information from a receipt from a different store by retrieving the UPC code and identifying the product.

The server 10 may thus extract receipt data 98 from the receipt(s) 26 which have been provided by the customer 14. The server may query the product database 30 to obtain additional product information from the receipt data 98. In one example, the product database 30 may contain information for products sold by the store. The server 10 may thus identify products on the receipts 26 which are sold by the store and may analyze those products as discussed.

In another example, the product database 30 may contain information for a much larger range of products which are not sold by the store. The product database 30 may contain product information for products which are similar or analogous to products sold by the store. Thus, the server 10 may analyze the receipt data 98 to identify both products sold by the store and products which are similar to those sold by the store. These products may be a different brand, etc. than a similar product sold by the store. In this example, the product database 30 may contain some item description for each product and the server 10 may analyze products identified by UPC in a receipt 26 which are not sold by the store to determine if the store sells an equivalent product.

The server 10 may analyze receipt data 98 extracted from multiple receipts 26 and calculate customer purchase data 102. The server 10 may determine customer purchasing habits. For example, the server 10 may determine that the customer 14 purchases dishwater detergent every 4 weeks or purchases a loaf of bread every week. As an example, the server 10 may create a database record for the customer 14 which may be saved in a customer database 38 along with customer profile, preference, and contact information associated with the customer account. In determining customer purchase data 102, the server 10 may correlate receipt purchase dates 78 with the item UPC codes 70 and, for a particular item UPC code, determine a frequency of purchase. The server 10 may determine when an item was most recently purchases and, from the customer purchase data, determine when the customer will likely need to purchase the item again.

Additionally, the server 10 may further determine a genus of an item type (e.g. bread or white bread) for different species of item purchases (e.g. particular brands of white bread). The server 10 may then, for a particular genus of item, determine a purchase frequency for that type of item. For certain items like razor cartridges, the customer 14 may always purchase the same item. For other items like bread or milk, the customer may purchase different brands of the item depending on what is available or what is on sale. The purchase data 102 may be saved by the server 10. The server 10 may save the purchase data 102 in a database record associated with the customer 14 in the customer database 38. As the customer makes additional purchases, these additional receipts 26 may also be uploaded to the server 10 and the server 10 may continue to analyze the additional receipts 26 to further determine customer purchasing frequencies for particular items.

The server 10 may combine/merge all of the receipt data 98 and purchase data into a single database record for each particular customer 14. The server 10 may merge information based on customer account numbers or contact number (such as a telephone number associated with an electronic device 18). The final dataset (i.e. a database record) may be stored on the server 10. Items 66 purchased by the customer 14 may be identified as "favorites" within the customer's account and within a customer database record.

Figure 4:
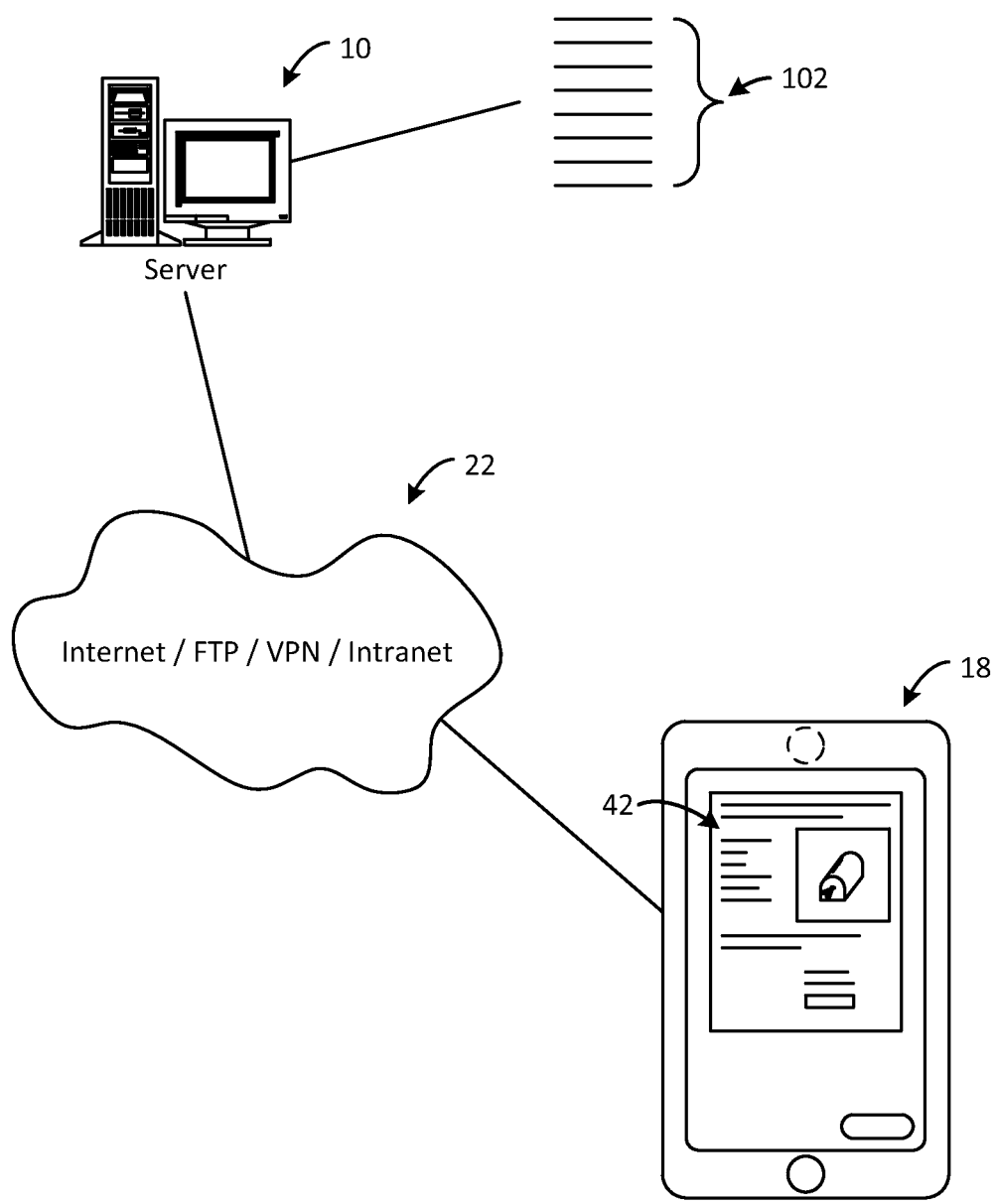

Referring now to FIG. 4, the server 10 may utilize the customer purchase data 102 to create purchase suggestions specific to the customer 14. Particularly, the server 10 may use identified patterns or frequencies for purchasing a particular item 66 or type of item to create a purchase suggestion 42 for the customer to suggest purchase of that item. The server 10 may present the purchase suggestion 42 to the customer on the electronic device 18.

As an example, the purchase suggestion 42 may be an internet webpage, window, or notification. The server 10 may identify when the customer 14 is shopping online on a webpage associated with the store such as by detecting that the customer has logged into their customer account with the store. The server 10 may then present a purchase suggestion 42 to the customer suggesting or reminding them to purchase a particular product. The purchase suggestion 42 may be a suggestion to add a certain product to their online shopping cart, and may contain text indicating that the customer 14 typically purchases this product every X number of weeks and that it is likely time to purchase it. The purchase suggestion 42 may be displayed as the customer is finalizing their cart for checkout, or may be displayed when the customer logs into their account and begins shopping.

As another example, the purchase suggestion 42 may be displayed as a message or notification on a mobile electronic device 18. Where the electronic device 18 is mobile such as a smart phone or a tablet computer, the server may transmit a text notification 42, pop-up window notification, etc. Where a customer 14 has associated a mobile electronic device 18 with their customer account, they will typically bring that device with them when shopping at a brick and mortar store location. The store location may communication with the mobile electronic device 18 via WIFI and, possibly with involvement of store account software installed on the device 18, detect when the mobile electronic device 18 enters the store The store may use a WIFI access point to ping or send communications with the device 18 and may detect when the device comes within range of the WIFI access point and authenticates to the WIFI network. The server 10 may then send a message to the customer 14 via the device 18 suggesting that they purchase a particular item.

Figure 5:
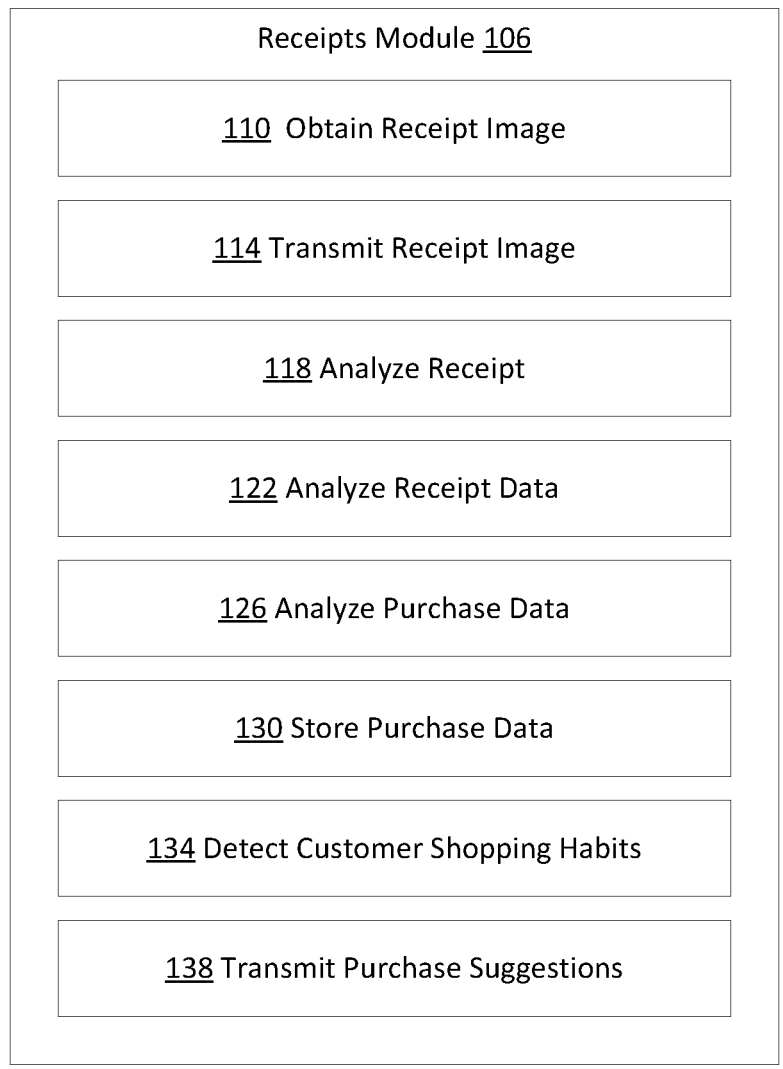
FIG. 5 shows a diagram of the receipts module.

Referring now to FIG. 5, a receipts module 106 may execute one or more of the steps discussed herein. The receipts module 106 may be store and operate on the server 10, on the electronic device 18, or on both the server 10 and electronic device 18. As discussed, the receipts module 106 may obtain 110 a picture of a receipt or may otherwise obtain information sufficient to identify a receipt and associated transaction within the server 10. The receipts module 106 may transmit 114 the receipt image to the server 10. The receipts module 106 may analyze 118 the receipt 26 to extract receipt data from the receipt. The receipts module 106 may then analyze 122 the receipt data to determine customer purchase data, and may also analyze 126 the purchase data to determine customer purchasing habits/frequencies. The receipts module 106 may then store 130 the customer purchase data, purchasing habits and frequencies, etc. in association with a customer account. The receipts module 106 may then detect 134 when the customer is shopping at the store and may transmit 138 purchase suggestions 42 to the customer 14.

Figure 6:
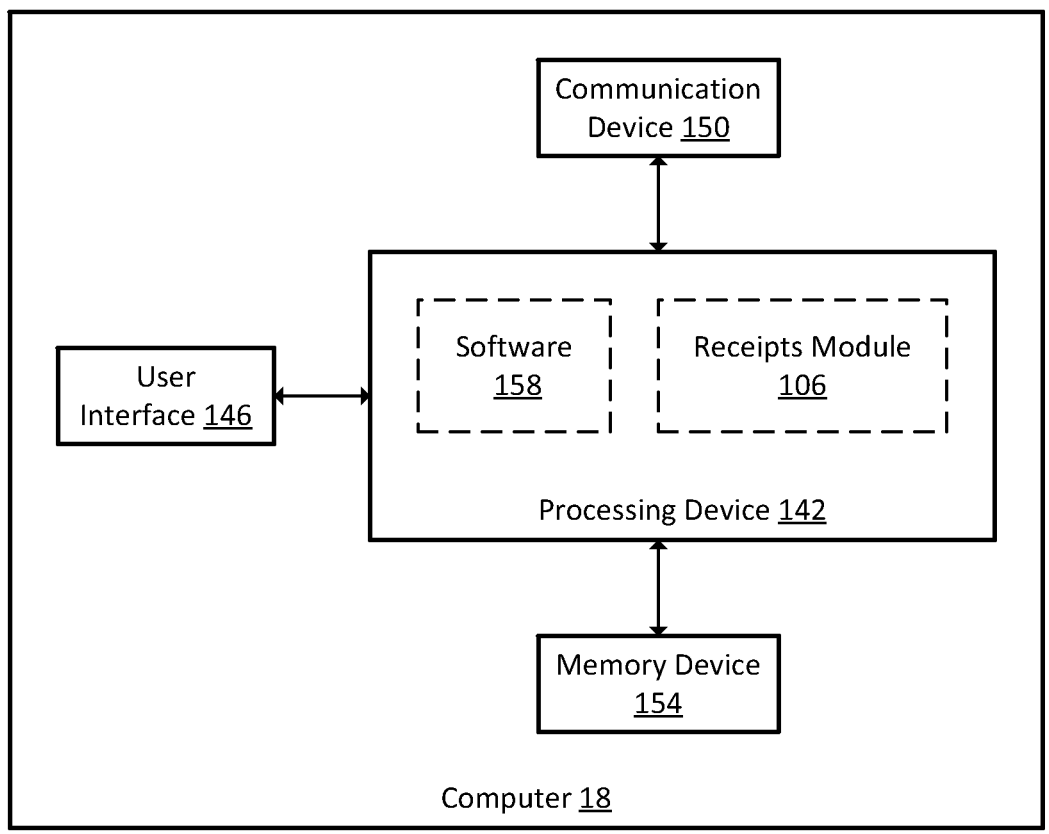
FIG. 6 is a schematic illustrating example components of the mobile electronic device or computer.

Referring now to FIG. 6, a schematic illustrating example components of the computer 18 is shown. As discussed, the computer 18 may be a smart phone, tablet computer, laptop computer, desktop computer, etc. Frequently, the computer 18 will be a smart phone or tablet computer which is capable of receiving and displaying internet data, messages, and webpages. The computer 18 includes a processing device 142, a user interface 146, a communication device 150, and a memory device 154. It is noted that the computer 18 can include other components and some of the components are not required.

The processing device 142 can include memory, e.g., read only memory (ROM) and random access memory (RAM), storing processor-executable instructions and one or more processors that execute the processor-executable instructions. In embodiments where the processing device 142 includes two or more processors, the processors can operate in a parallel or distributed manner. The processing device 142 can execute the operating system of the computer 18. In one example, the processing device 142 may also executes a software module 158 and a receipts module 106.

The user interface 146 is a device that allows a user, a customer in particular, to interact with the computer 18. While one user interface 146 is shown, the term "user interface" can include, but is not limited to, a touch screen, a physical keyboard, a mouse, a camera, a microphone, and/or a speaker. The communication device 150 is a device that allows the computer 18 to communicate with another device, e.g., the server 10. The communication device 150 can include one or more wireless transceivers for performing wireless communication and/or one or more communication ports for performing wired communication. The memory device 154 is a device that stores data generated or received by the computer 18. The memory device 154 can include, but is not limited to, a hard disc drive, an optical disc drive, and/or a flash memory drive.

The receipts module 106 allows a user, a customer in particular, to transmit receipts 26 and receive shopping data which is specific to the customer in the form of a purchase suggestion 42. The receipts module 106 also allows the computer 18 to execute one or more tasks as discussed herein.

Figure 7:
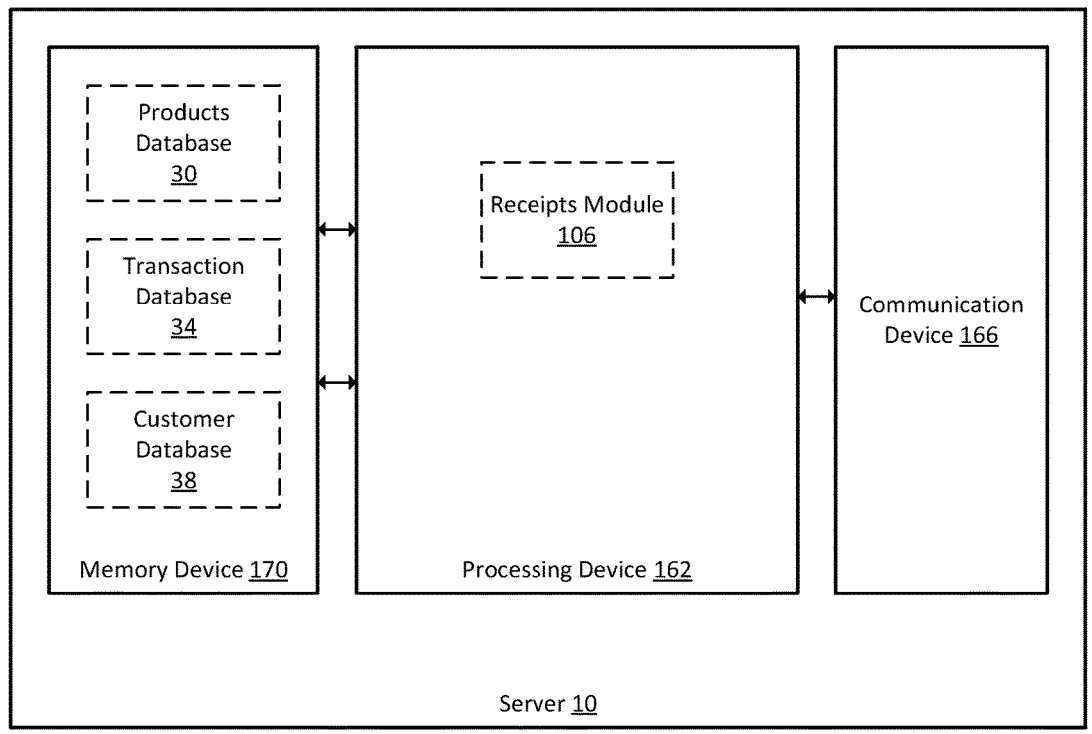
FIG. 7 is a schematic illustrating example components of a server.

The server 10 may be programmed to perform one or more functions at the request of the computer 18 and, according to various computing models, may execute some or all of the functions associated with operation of the receipts module 106. FIG. 7 illustrates an example embodiment of a server 10 which is programmed to perform one or more of the requested functions. The server 10 may include a processing device 162, a communication device 166, and a memory device 170.

The processing device 162 can include memory, e.g., read only memory (ROM) and random access memory (RAM), storing processor-executable instructions and one or more processors that execute the processor-executable instructions. In embodiments where the processing device 162 includes two or more processors, the processors can operate in a parallel or distributed manner. In the illustrative embodiment, the processing device 162 executes a receipts module 106. The receipts module 106 may execute, process, or facilitate internet communications, receipt data, purchasing data, a database, purchase suggestions, etc. as discussed herein.

The communication device 166 is a device that allows the server 10 to communicate with another device, e.g., the computer 18. The communication device 166 can include one or more wireless transceivers for performing wireless communication and/or one or more communication ports for performing wired communication.

The memory device 170 is a device that stores data generated or received by the server 10. The memory device 170 can include, but is not limited to a hard disc drive, an optical disc drive, and/or a flash memory drive. Further, the memory device 170 may be distributed and located at multiple locations. The memory device 170 is accessible to the processing device 162. In some embodiments, the memory device 170 stores data such as a products database 30, a transaction database 34, and a customer database 38.

In some embodiments, the products database 30 can store information associated with products such as product UPC code, description, price, etc. The product database 30 may be queried by the processing device 162 and may provide information to the processing device to facilitate the processing of receipts and the creation of purchase suggestions 42.

The transaction database 34 may store information regarding actual purchase transactions at the store. The transaction database 34 may be queried by the processor 162 to retrieve past transaction data based on a transaction ID 86.

The customer database 38 may store information regarding specific customers, such as customer account information, customer contact information and preferences, customer purchase history and habits, etc. The customer database 38 may be queried by the processing device 162 and may transmit information to the processing device to facilitate the creation of purchase suggestions 42 for the customer. In this manner, the processing device 162 may execute the receipts module 106 to receive and process receipt images 26, receipt data 98, customer purchase data 102, and purchase suggestions 42.

Figure 8:
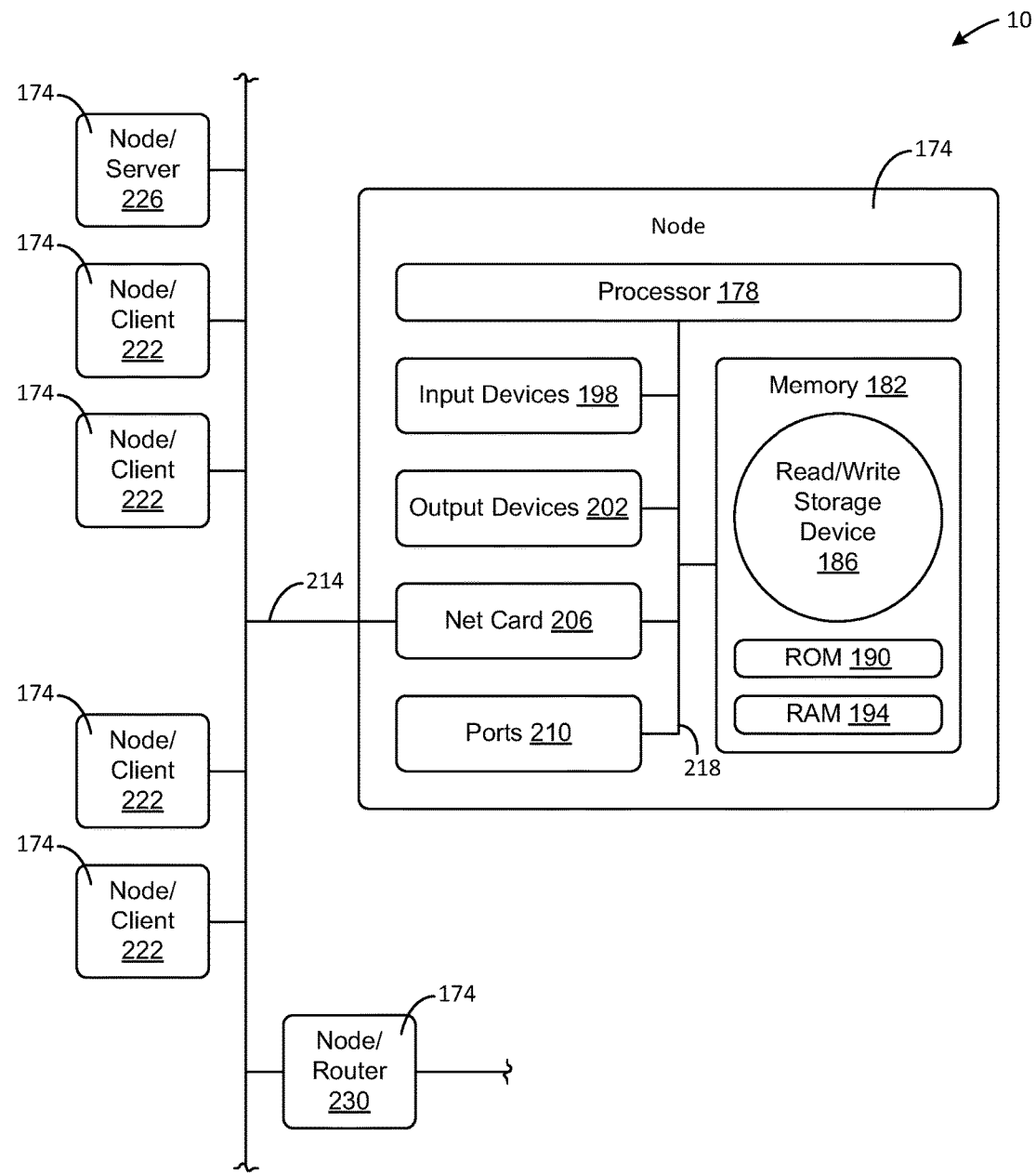
FIG. 8 is another schematic illustrating example components of a server.

Referring now to FIG. 8, an example node map illustrating how a server 10 may be implemented in different manners is shown. A server 10 in accordance with the present invention may provide, enable, or support the processing of receipts 26 and the execution of a receipts module 106 in any suitable manner. In certain embodiments, a server 10 may be embodied as hardware, software, or some combination thereof. For example, in selected embodiments, a server 10 may include one or more nodes 174.

A node 174 may include one or more processors 178 or central processing units (CPUs) 178. A node 174 may also include memory 182. Such memory 182 may be operably connected to a processor 178 and include one or more devices such as a hard drive 186 or other non-volatile storage device, read-only memory (ROM) 190, random access memory (RAM) 194, or the like or a combination or sub-combination thereof. In selected embodiments, such components may exist in a single node 174. Alternatively, such components may be distributed across multiple nodes 174.

In selected embodiments, a node 174 may include one or more input devices 198 such as a keyboard, mouse, touch screen, scanner, memory device, communication line, and the like. A node 174 may also include one or more output devices 202 such as a monitor, output screen, printer, memory device, and the like. A node 174 may further include a network card 206, port 210, or the like to facilitate communication through a computer network 214. Internally, one or more busses 218 may operably interconnect various components of a node 174 to provide communication therebetween. In certain embodiments, various nodes 174 of a server 10 may contain more or less of the components described hereinabove.

Different nodes 174 within a server 10 may perform difference functions. For example, one or more nodes 174 within a server system 10 may function as or be clients 222. Additionally, one or more nodes 174 within a system 10 may function as or be servers 226 Accordingly, a server system 10 may include one or more server nodes 226 or the like serving files, data, applications, etc. to one or more clients 222 connected thereto. A server 10 may also include one or more nodes 174 that function as or are routers 230 and the like. Accordingly, one computer network 214 may be connected to other computer networks via one or more routers 230.

The computer system is advantageous as it does not require any additional hardware to implement. The system can be implemented on an existing store server 10 and utilizing resources such as electronic devices 18 already possessed by customers 14. The computer system may be implemented on existing electronic devices 18 with only software. With minimal cost to implement the system, customers may be encouraged to adopt online shopping with a store and to create an account with the store. The customer may benefit from additional product reminders from the store and personalized attention to their shopping needs. The store may benefit from the increased revenue that comes from better customer service.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

What is claimed is:

1. A computer implemented method comprising:
providing a wireless access point associated with a store;
receiving, by a computer server coupled to the wireless access point, multiple receipts for past purchase transactions from a customer from a mobile device associated with the customer, wherein the multiple receipts are received as a plurality of receipt images;
for each receipt image of the plurality of receipt images:
  processing the receipt image using optical character recognition;
  identifying a UPC code associated with a product on the receipt image; and
  correlating the product with a purchase date from the receipt image;
determining, by the computer server, that at least one of the multiple receipts corresponds to a transaction at the store;
comparing, by the computer server, the product to a product database to determine whether the product is sold by the store;
analyzing, by the computer server, the plurality of receipt images to determine a frequency with which the customer purchases the product, the frequency being a multiple number of weeks that is less frequent than shopping visits to the store by the customer;
determining, by the computer server, a date when the customer last purchased the product;
assigning, by the computer server, a product genus and a product species to the product, wherein the product species corresponds to a particular brand;
determining, by querying a customer database containing information about the customer including product preferences, a stored product preference regarding the product species for the product based on the past purchase transactions associated with the customer;

determining an equivalent product for the product when the product is not sold by the store, wherein the equivalent product is sold at the store and is based on the product genus of the product being the same as a genus of the equivalent product;

generating, at the computer server, a user interface on the mobile device, the user interface comprising at least one purchase suggestion for the product by a retailer associated with the store, the at least one purchase suggestion comprising a time calculated to correlate with the customer needing to purchase the product based on the date when the customer last purchased the product, the multiple number of weeks of the frequency with which the customer purchases the product, and the stored product preference;

using, by the computer server, the wireless access point to send a notification signal to the mobile device;

detecting, by the computer server, that the mobile device is in range of the wireless access point and connects to a wireless network via the wireless access point; and communicating, over the wireless network connection from the computer server to the mobile device, a push notification containing the at least one purchase suggestion.

2. A computer implemented method comprising:

providing a wireless access point associated with a store;

receiving, by a computer server coupled to the wireless access point, multiple receipts for past purchase transactions from a customer, wherein the multiple receipts are received as a plurality of receipt images;

for each receipt image of the plurality of receipt images:
  processing the receipt image using optical character recognition;
  identifying a UPC code associated with a product on the receipt image; and
  correlating the product with a purchase date from the receipt image;

analyzing, by the computer server, the plurality of receipt images to determine a frequency with which the customer purchases the product the frequency being a multiple number of weeks that is less frequent than shopping visits to the store by the customer;

determining, by the computer server, a date when the customer last purchased the product;

assigning, by the computer server, a product genus and a product species to the product, wherein the product species corresponds to a particular brand;

determining, by querying a customer database containing information about the customer including product preferences, a stored product preference regarding the product species for the product based on the past purchase transactions associated with the customer;

determining an equivalent product for the product when the product is not sold by the store, wherein the equivalent product is sold at the store and is based on the product genus of the product being the same as a genus of the equivalent product;

generating, at the computer server, a user interface on a mobile device of the customer, the user interface comprising at least one purchase suggestion for the product by a retailer associated with the store, the at least one purchase suggestion comprising a time calculated to correlate with the customer needing to purchase the product based on the date when the customer last purchased the product, the multiple number of weeks of the frequency with which the customer purchases the product, and the stored product preference;

using, by the computer server, the wireless access point to send a notification signal to the mobile device;

detecting, by the computer server, that the mobile device is in range of the wireless access point and connects to a wireless network via the wireless access point; and communicating, over the wireless network connection to the mobile device, a push notification containing the at least one purchase suggestion prompting the customer to access the user interface at the time calculated.

3. A computer system comprising:

a wireless access point associated with a store;

a computer server coupled to the wireless access point and being configured to execute a receipts module, the receipts module being programmed to:
  receive multiple receipts for past purchase transactions from a customer from a mobile device associated with the customer, wherein the multiple receipts are received as a plurality of receipt images;
  for each receipt image of the plurality of receipt images:
    process the receipt image using optical character recognition;
    identify a UPC code associated with a product on the receipt image; and
    correlate the product with a purchase date from the receipt image;
  analyze the plurality of receipt images to determine a frequency with which the customer purchases the product, the frequency being a multiple number of weeks that is less frequent than shopping visits to the store by the customer,
  determine a date when the customer last purchased the product;
  assign a product genus and a product species to the product, wherein the product species corresponds to a particular brand;
  determine, by querying a customer database containing information about the customer including product preferences, a stored product preference regarding the product species for the product based on the past purchase transactions associated with the customer;
  determine an equivalent product for the product when the product is not sold by the store, wherein the equivalent product is sold at the store and is based on the product genus of the product being the same as a genus of the equivalent product; and
  determine that at least one of the multiple receipts corresponds to a transaction at the store; and a user interface on the mobile device, the user interface comprising at least one purchase suggestion for the product by a retailer associated with the store the at least one purchase suggestion comprising a time calculated to correlate with the customer needing to purchase the product based on the date when the customer last purchased the product, the multiple number of weeks of the frequency with which the customer purchases the product, and the stored product preference;

wherein the computer server:
  uses the wireless access point to send a notification signal to the mobile device;
  detects that the mobile device is in range of the wireless access point and connects to a wireless network via the wireless access point; and
  communicates to the mobile device over the wireless network connection a push notification containing the at least one purchase suggestion.

4. The computer implemented method of claim 1, wherein the product genus corresponds to a type of product.

5. The computer implemented method of claim 2, wherein the product genus corresponds to a type of product.

6. The computer system of claim 3, wherein the product genus corresponds to a type of product.

\* \* \* \* \*